Sept. 1, 1953    H. D. HUME ET AL    2,650,832
TRAILER HITCH
Filed April 9, 1951    4 Sheets-Sheet 1
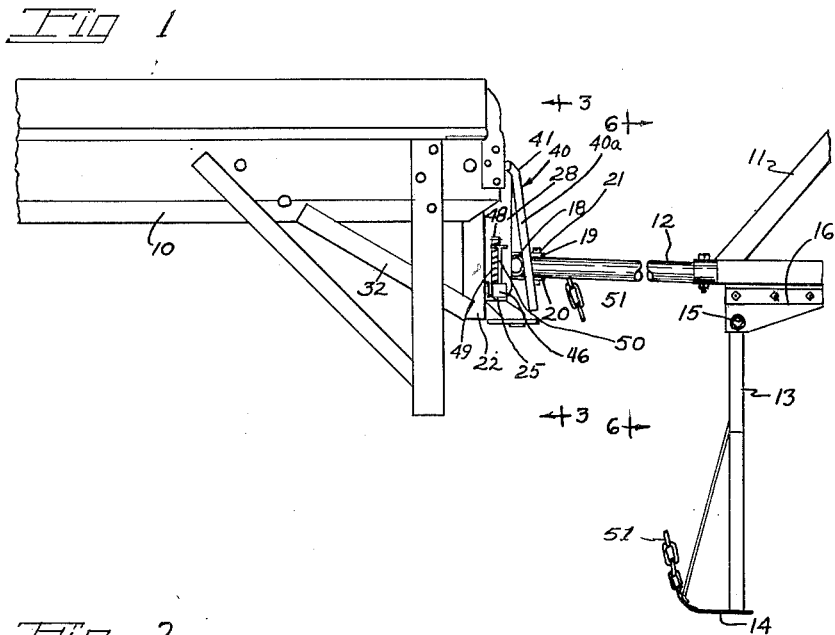
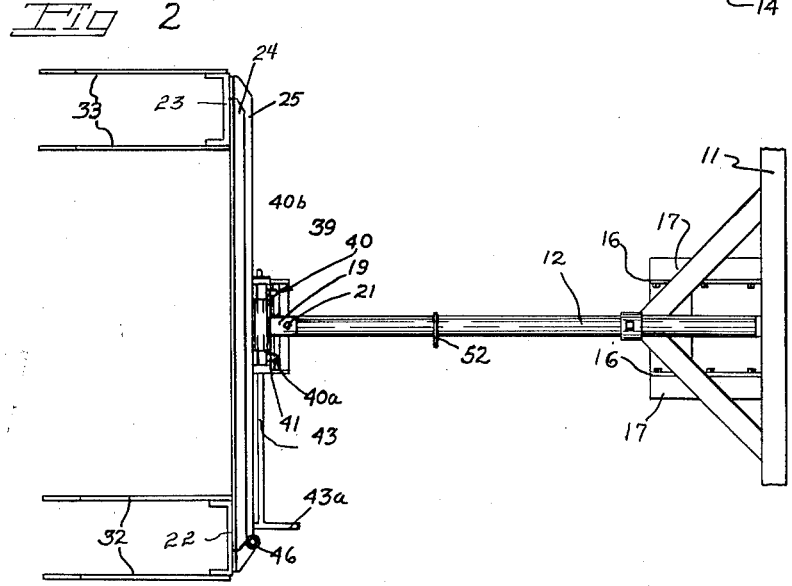
INVENTORS
Horace D. Hume
John D. Wheeler
BY
Greek Wells
Atty.

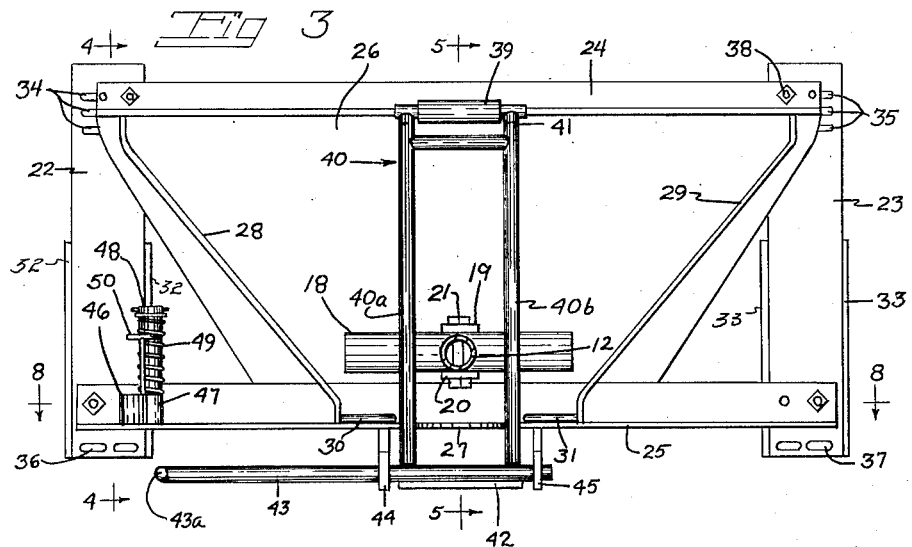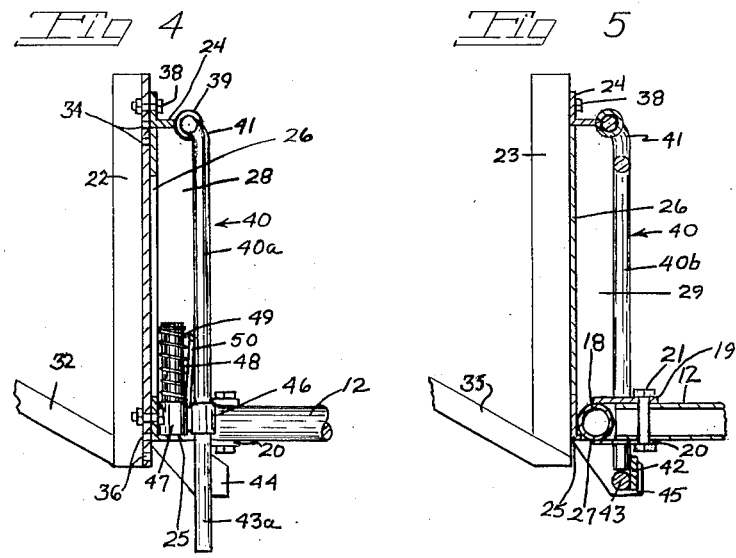

Sept. 1, 1953 H. D. HUME ET AL 2,650,832
TRAILER HITCH
Filed April 9, 1951 4 Sheets-Sheet 3
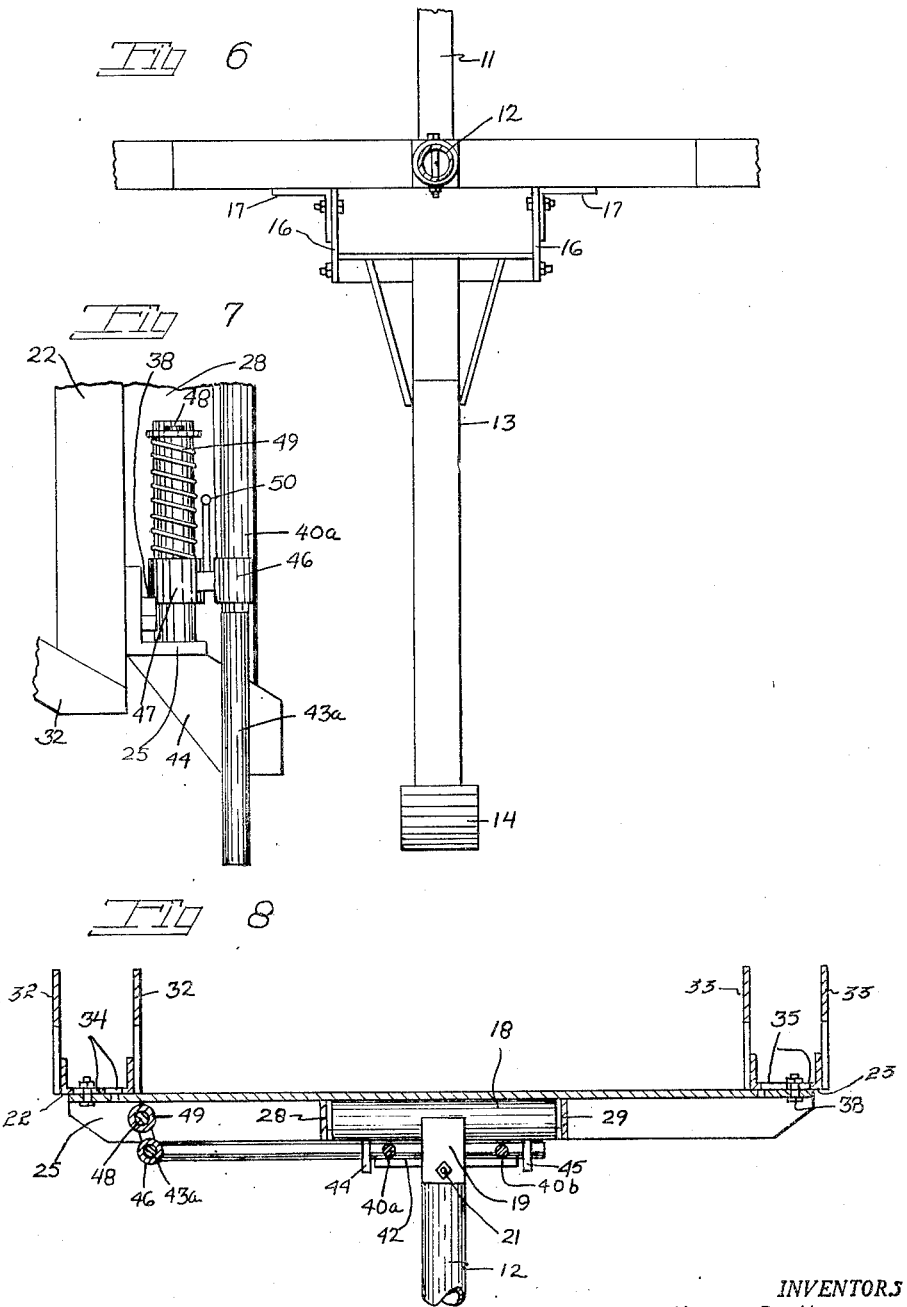
INVENTORS
Horace D. Hume
John D. Wheeler
BY
Greek Wells
Atty.

Sept. 1, 1953 H. D. HUME ET AL 2,650,832
TRAILER HITCH

Filed April 9, 1951 4 Sheets-Sheet 4

INVENTORS
Horace D. Hume
John D. Wheeler
BY
Greek Wells
Atty

Patented Sept. 1, 1953

2,650,832

UNITED STATES PATENT OFFICE 2,650,832

TRAILER HITCH

Horace D. Hume and John D. Wheeler, Mendota,
Ill.; said Wheeler assignor to said Hume Application April 9, 1951, Serial No. 219,992

3 Claims. (Cl. 280—33.15)

Our invention relates to improvements in a trailer hitch.

The purpose of this invention is to provide a means of quickly attaching a trailer to a towing vehicle and quickly detaching the trailer from the towing vehicle. In the application of Horace D. Hume, Serial Number 200,578, filed December 13, 1950, for Trailer Type Crop Loader, a crop loader is shown that is trailed behind a truck and that picks up the crop, elevates it and advances it forwardly into the truck. With this type of loader mechanism the towing vehicles are disconnected from the loader as soon as they receive a load and a new towing vehicle is connected to the loader to continue the loading operation while the first towing vehicle carries its load to an unloading point and returns. Our present invention is directed to a novel trailer hitch that facilitates the connecting and disconnecting of the truck to the loader.

Our invention contemplates the provision of a trailer hitch for the purpose above referred to which includes means for keeping the towing tongue of the trailer in position to have a truck or other towing vehicle attaching means backed into it. The construction of the hitch is such that a considerable amount of inaccuracy in alignment of the two vehicles is permissible. The construction also is such that considerable up and down play of the tongue on the trailing vehicles may take place without affecting the hitch. This is particularly advantageous in the application of the hitch to a loader to truck connection because the ground over which the two vehicles have to travel may often be quite rough. The shoes on the pick up device of the loader may force the tongue and front part of the loader upward at times, in so doing the tongue would lift the rear end of the truck were it not for this flexibility.

The nature and advantages of the invention will appear more fully from the following description and the accompanying drawings wherein a preferred form of the invention is shown. It should be understood however, that the drawings and description are illustrative only and are not intended to limit the invention except insofar as it is limited by the claims.

In the drawings:

Figure 1 is a view in side elevation showing the rear end of a truck and the front end of a crop loader connected by our hitch;

Figure 2 is a plan view of the hitch mechanism;

Figure 3 is a view on an enlarged scale taken on the line 3—3 of Figure 1;

Figure 4 is a sectional view on the line 4—4 of Figure 3;

Figure 5 is a sectional view taken on the line 5—5 of Figure 3;

Figure 6 is an enlarged view taken on the line 6—6 of Figure 1;

Figure 7 is an enlarged fragmentary view illustrating the latch mechanism for the hitch;

Figure 8 is a sectional view taken on the line 8—8 of Figure 3; and

Figure 9:
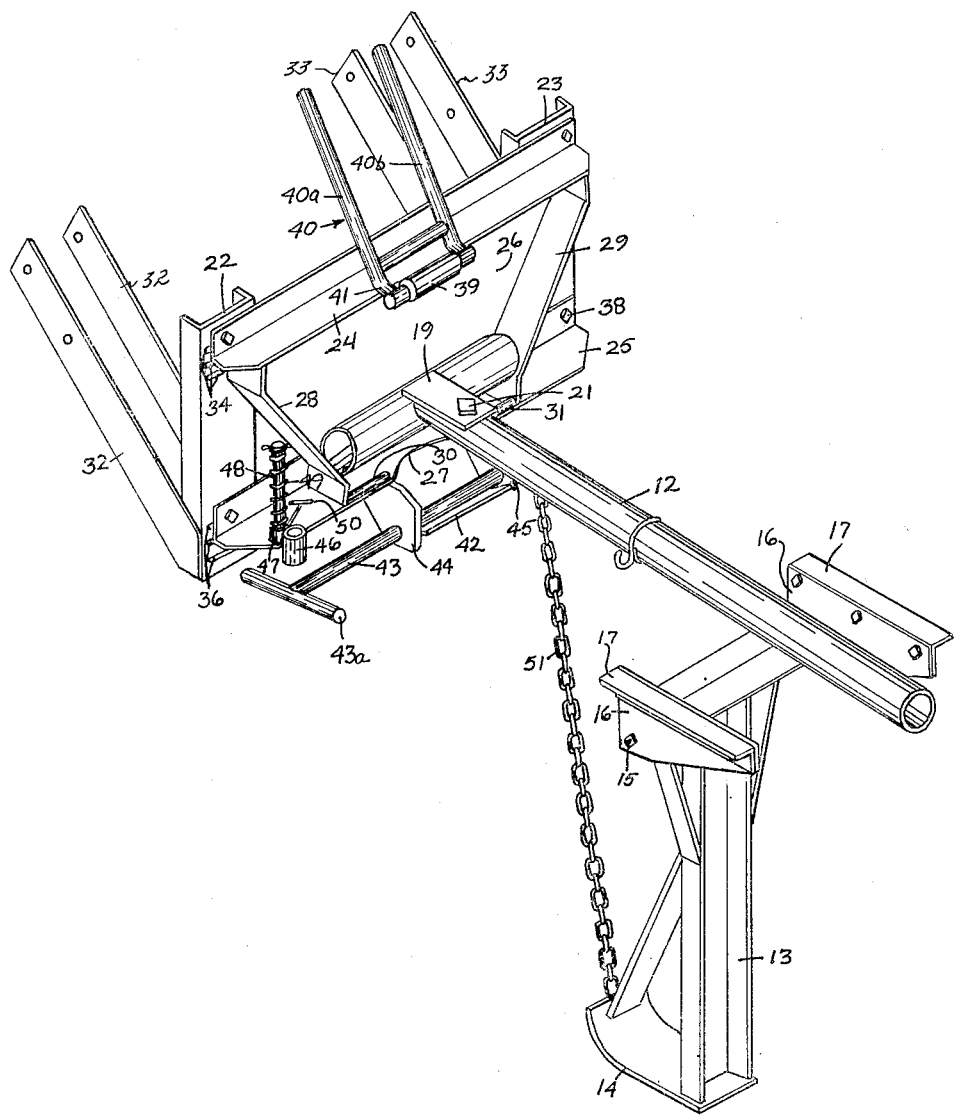
Figure 9 is a perspective view illustrating the hitch mechanism.

Referring now in detail to the drawings the numeral 10 illustrates a part of the framework at the rear of the truck body. The details of this framework are of no importance to the present invention and will not be further described. The numeral 11 indicates generally the front end of the trailer vehicle such as the crop loader illustrated in the application referred to above. This trailer vehicle has a tongue 12 by which it is to be attached to a towing vehicle such as the truck, the frame of which is shown at 10. A pedestal 13 is pivoted beneath the front end 11 of the trailer vehicle for holding the tongue 12 at a suitable elevation for attachment to the towing vehicle. This pedestal has a shoe portion 14 resting on the ground. The pedestal is pivoted at 15 to brackets 16 that are bolted to angle irons 17 on the frame 11 of the trailer vehicle.

The tongue 12 has a cross piece 18 at its front end which is adapted to engage that part of the hitch that is secured to the truck. The cross piece 18 and the tongue 12 desirably may be made of pipe sections pivotally coupled together by plates 19 and 20 fixed on the cross piece 18 and pivoted to the tongue 12 by a pin 21.

The part of the trailer hitch that is mounted on the truck comprises a framework made up of two upright channels 22 and 23, an upper cross member 24 and a lower cross member 25 bolted to the channels 22 and 23 and a stop plate 26 which connects the cross member 24 and 25 and is welded to them. The cross members 24 and 25 are angle irons. The member 25 has its lower flange cut away at 27 to receive the plate 20 when the cross piece 18 rests on the flange of the member 25. Two ribs 28 and 29 are provided on the plate 26. They extend downwardly from the lower flange of the cross member 24 and inwardly to the cross member 25 to provide downwardly converging guides for the cross piece 18. On the lower flange of the cross member 25 two round rod sections 30 and 31 are provided between the guide ribs 28 and 29 and the cut away portion 27. These rod sections 30 and 31 are spaced from the upright flange of the member 25 so as to permit the cross member 18 to seat between the rod sections and the upright flange of the member 25.

The upright channels 22 and 23 are adapted to be bolted to the truck frame. Diagonally extending braces 32 on the channel 22 and like braces 33 on the channel 23 also connect to the truck frame to provide the necessary mounting facilities for the hitch. The unit comprising the members 24 and 25 and the plate 26 can be adjusted laterally and vertically on the channels 22 and 23 by means of a plurality of laterally elongated slots 34 and 35 at the tops of the channels 22 and 23 and like slots 36 and 37 at the lower ends of the channels 22 and 23. Bolts 38 secure the members 23 and 25 to the channels 22 and 23.

A latch means for latching the cross piece 18 to the frame on the truck comprises a two prong member 40 that is pivoted in a sleeve 39 that is secured to the horizontal flange of the cross member 24. The member 40 is offset as indicated at 41 so that when it is swung upward it will tend to stay in the raised position. As soon as the cross piece 18 has located against the plate 26, the member 40 can be swung down so that its prongs 40a and 40b go on opposite sides of the tongue 12. A latch piece 42 is secured on a rod 43. The rod 43 is supported by two brackets 44 and 45 that extend downwardly from the cross member 25. As shown best by Figure 5, rotation of the rod 43 moves the latch piece 42 up into position to lock the prongs 40a and 40b when the handle 43a of the rod 43 is vertical. When the handle 43a is horizontal the latch piece 42 is down out of the way so that the truck may be pulled away from the tongue 12.

The latch piece 42 is locked in holding position by the mechanism illustrated in Figure 7 of the drawings. This mechanism comprises a ring 46 which is adapted to be fitted over the end of the handle 43a. The ring 46 is connected to a collar 47 which can rotate and slide up and down on a post 48 that is fixed to the horizontal flange of the cross member 45. A spring 49 on the post 48 urges the collar 47 downward. A finger piece 50 is provided for lifting the collar 47 and the ring 46 high enough to permit the handle 43 to be aligned with the ring 46.

The pedestal 13 is provided with a chain 51 and the tongue 12 has a hook 52 thereon so that the pedestal can be swung up into carrying position. If the weight on the tongue is too great the pedestal is released by backing the towing vehicle and trailing vehicle after they are coupled together until the pedestal 13 is tipped over and then lifting the pedestal and hooking the chain into the hook 52. When the operator desires to disconnect the trailing vehicle from the towing vehicle, the pedestal 13 is lowered and swung into upright position. Then the ring 46 is released from the handle 43a to permit the latch piece 42 to turn to horizontal position. The operator can then drive the towing vehicle away since the member 40 is free to swing outward and allow the cross piece 18 to pass beneath it.

The trailing vehicle is connected to a towing vehicle by backing the towing vehicle, with the member 40 raised as shown in Figure 9, until the cross piece engages the stop plate 26. The two vehicles do not have to be exactly aligned. The cross piece 18 can turn about the pin 21 to allow for lack of alignment. Also the cross piece 18 is held elevated, as shown in Figures 1 and 3, by the pedestal 13 so that there is allowance for failure of the cross piece to center exactly between the ribs 28 and 29. When the coupling is completed the cross piece normally rides on the lower cross member 25 and seats behind the rod sections 30 and 31. These rod sections take part of the strain from the prongs of the member 40.

It is believed that the nature and advantages of our invention will be apparent from the foregoing description. Having described our invention, we claim:

1. A trailer hitch comprising a tongue having means for attachment to a trailing vehicle, a horizontal cross piece pivoted on the front end of the tongue to turn in a horizontal direction, a framework having means for attachment to a towing vehicle, said framework comprising a stop plate against which the cross piece is aligned by movement of the framework toward the tongue, an upper cross member projecting rearwardly from the top of the stop plate, a lower cross member spaced below the upper cross member a distance several times the height of the cross piece and projecting rearwardly from the bottom of the stop plate, said cross members being joined by side guides which are spaced apart, at the lower cross member, a distance sufficient snugly to receive the cross piece therebetween and which diverge upwardly to the upper cross member, the guides and cross members forming with the stop plate a large, downwardly narrowing recess into which the cross piece may enter and be aligned with the stop plate, two latch prongs pivoted on the framework and spaced apart to receive the tongue between them, said prongs being movable between a raised position, above the upper cross member, and a lowered position, where they extend from the upper cross member downwardly past the lower cross member and behind the cross piece when the cross piece is against the stop plate, and a latch piece below the lower cross member for securing the lower ends of said prongs, a rod carrying said latch piece and rotatably mounted on the framework to move the latch piece into and out of securing engagement with said prongs, and means to secure the rod against rotation.

2. A trailer hitch comprising a tongue having means for attachment to a trailing vehicle, a horizontal cross piece pivoted on the front end of the tongue to turn in a horizontal direction, a framework having means for attachment to a towing vehicle, said framework comprising a stop plate against which the cross piece is aligned by movement of the framework toward the tongue, an upper cross member projecting rearwardly from the top of the stop plate, a lower cross member spaced below the upper cross member a distance several times the height of the cross piece and projecting rearwardly from the bottom of the stop plate, said cross members being joined by side guides which are spaced apart, at the lower cross member, a distance sufficient snugly to receive the cross piece therebetween and which diverge upwardly to the upper cross member, the guides and cross members forming with the stop plate a large, downwardly narrowing recess into which the cross piece may enter and be aligned with the stop plate, two latch prongs pivoted on the framework and spaced apart to receive the tongue between them, said prongs being movable between a raised position, above the upper cross member, and a lowered position, where they extend from the upper cross member downwardly past the lower cross member and behind the cross piece when the cross piece is against the stop plate, and means to secure the latch prongs in the lowered position.

3. A trailer hitch comprising a tongue having means for attachment to a trailing vehicle, a horizontal cross piece pivoted on the front end of the tongue to turn in a horizontal direction, a framework having means for attachment to a towing vehicle, said framework comprising a stop plate against which the cross piece is aligned by movement of the framework toward the tongue, an upper cross member projecting rearwardly from the top of the stop plate, a lower cross member spaced below the upper cross member a distance several times the height of the cross piece and projecting rearwardly from the bottom of the stop plate, said cross members being joined by side guides which are spaced apart, at the lower cross member, a distance sufficient snugly to receive the cross piece therebetween and which diverge upwardly to the upper cross member, the guides and cross members forming with the stop plate a large, downwardly narrowing recess into which the cross piece may enter and be aligned with the stop plate, two latch prongs pivoted on the framework and spaced apart to receive the tongue between them, said prongs being movable between a raised position, above the upper cross member, and a lowered position, where they extend from the upper cross member downwardly past the lower cross member and behind the cross piece when the cross piece is against the stop plate, and means to secure the latch prongs in the lowered position, the lower cross member having raised sections spaced rearwardly from the stop plate for engagement with the rear lower face of the cross piece.

HORACE D. HUME.
JOHN D. WHEELER.

References Cited in the file of this patent

UNITED STATES PATENTS

| Number | Name | Date |
|---|---|---|
| 2,414,725 | Dunn | Jan. 21, 1947 |
| 2,478,591 | Miller | Aug. 9, 1949 |